March 22, 1932.    H. C. FOSTER    1,850,748
RUBBER FISHING FLOAT
Original Filed June 1, 1929
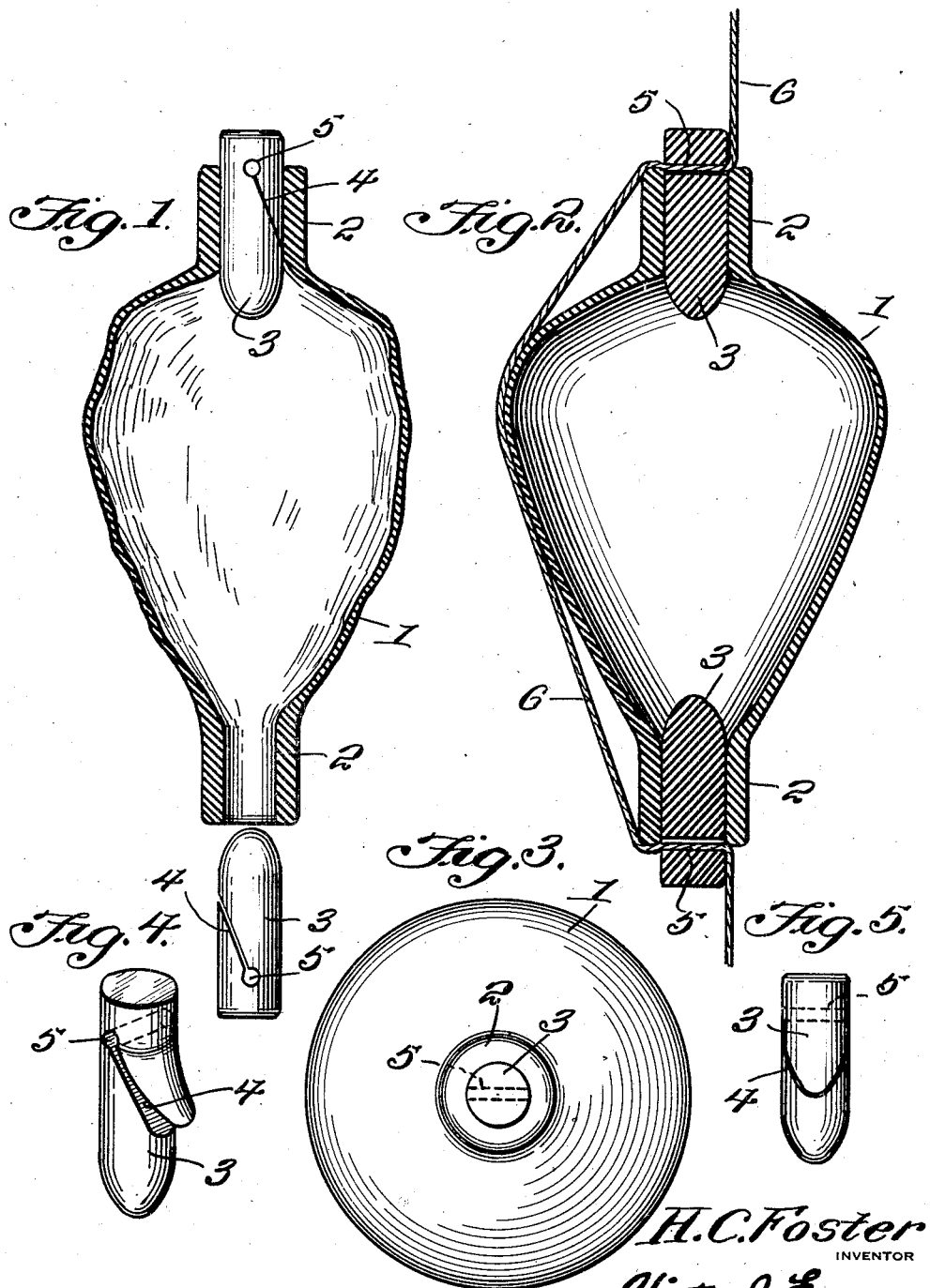
H.C.Foster
INVENTOR
BY Victor J. Evans
ATTORNEY
WITNESS: J.T.L. Wright Patented Mar. 22, 1932

1,850,748

UNITED STATES PATENT OFFICE

HARRY C. FOSTER, OF KEWANEE, ILLINOIS

RUBBER FISHING FLOAT

Application filed June 1, 1929, Serial No. 367,724. Renewed September 1, 1931.

This invention relates to a fishing "bob" or float, the general object of the invention being to make the device of rubber or the like and of hollow construction whereby it may be inflated, with plugs for closing the small ends of the body, said plugs having holes therein for receiving the line, the holes being so arranged that the float may be easily adjusted on the line.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a sectional view through the device, with the lower plug removed.

Figure 2 is a similar view but showing both plugs in place with the line passing through them and the body inflated.

Figure 3 is a top plan view of the device.

Figure 4 is a view of one of the plugs.

Figure 5 is a similar view, but looking toward the cut part of the plug.

In these views, the numeral 1 indicates the body of the float, which is formed of rubber or the like and is of a shape somewhat similar to a "bob" formed of cork. The body is formed with tubular ends 2, the walls of which are thickened as shown, and these ends are adapted to be closed by the plugs 3 which are preferably formed of rubber or the like. Each plug is cut as shown at 4, the cut extending diagonally from the exterior of the plug to a point slightly to one side of the center of the plug and adjacent the outer end thereof. At this point, the cut terminates in a transverse hole 5.

After one plug is inserted in one end, the body is inflated and then the other plug is inserted in the other end so that the plugs hold the air in the float. The line 6 is passed through the slits into the holes before the plugs are inserted and the plugs are pushed into the body a distance that will bring the holes partly within the ends so that the line is frictionally held by the walls of the holes and the edges of the ends. This will permit the float to be easily adjusted on the line and it will remain in adjusted position through friction. This manner of attaching the float to the line renders it easy to place the float on the line, as it is not necessary to remove the hook or sinker.

Thus I have provided a simple form of "bob" or float for a fish line which is inflatable and has great buoyancy and when not in use can be collapsed into a small size and placed in a pocket or other small space.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A float for a fishing line comprising an inflatable body having tubular ends which are thicker than the body, plugs for closing said ends, each plug having a slit therein and an opening at the inner end of the slit whereby part of a line can be passed into the hole through the slit, the plugs being pressed into the ends of the body to place the holes slightly inwardly from the extremities of the tubular ends, whereby the line is frictionally held between the plugs and said extremities.

In testimony whereof I affix my signature.

HARRY C. FOSTER.